Dec. 16, 1969 G. A. PETERSEN 3,483,931
ROUND HOLDER FOR REPLACEABLE CUTTERS FOR EARTH-DIGGING
Filed Oct. 22, 1965 6 Sheets-Sheet 3
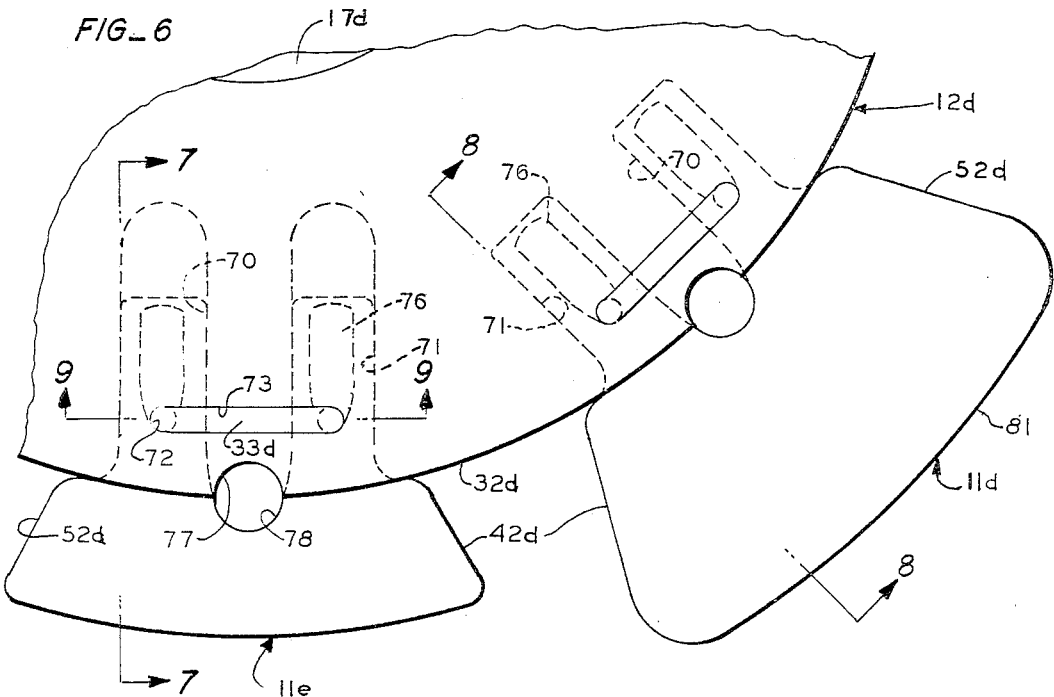
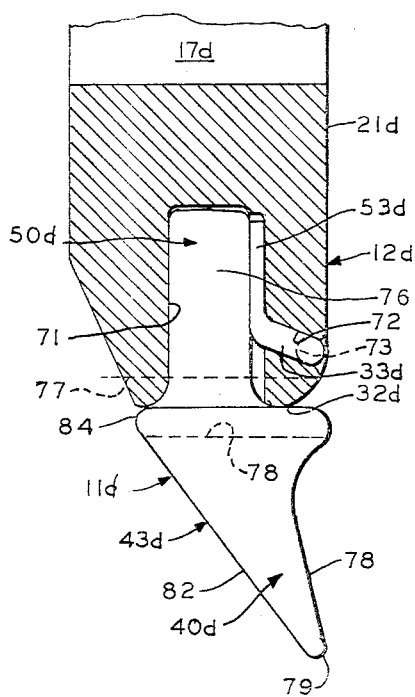
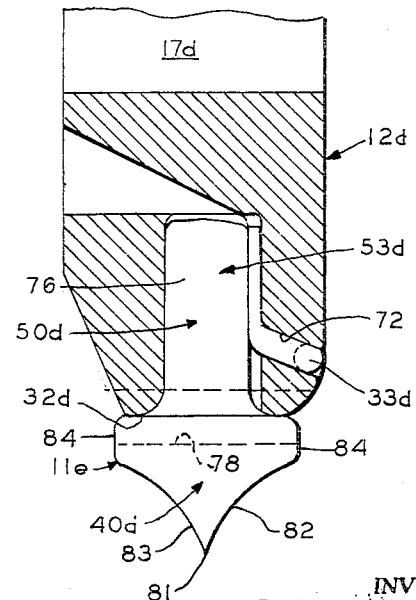
INVENTOR.
GERALD A. PETERSEN
BY
Julian Caplan
ATTORNEY FIG_12
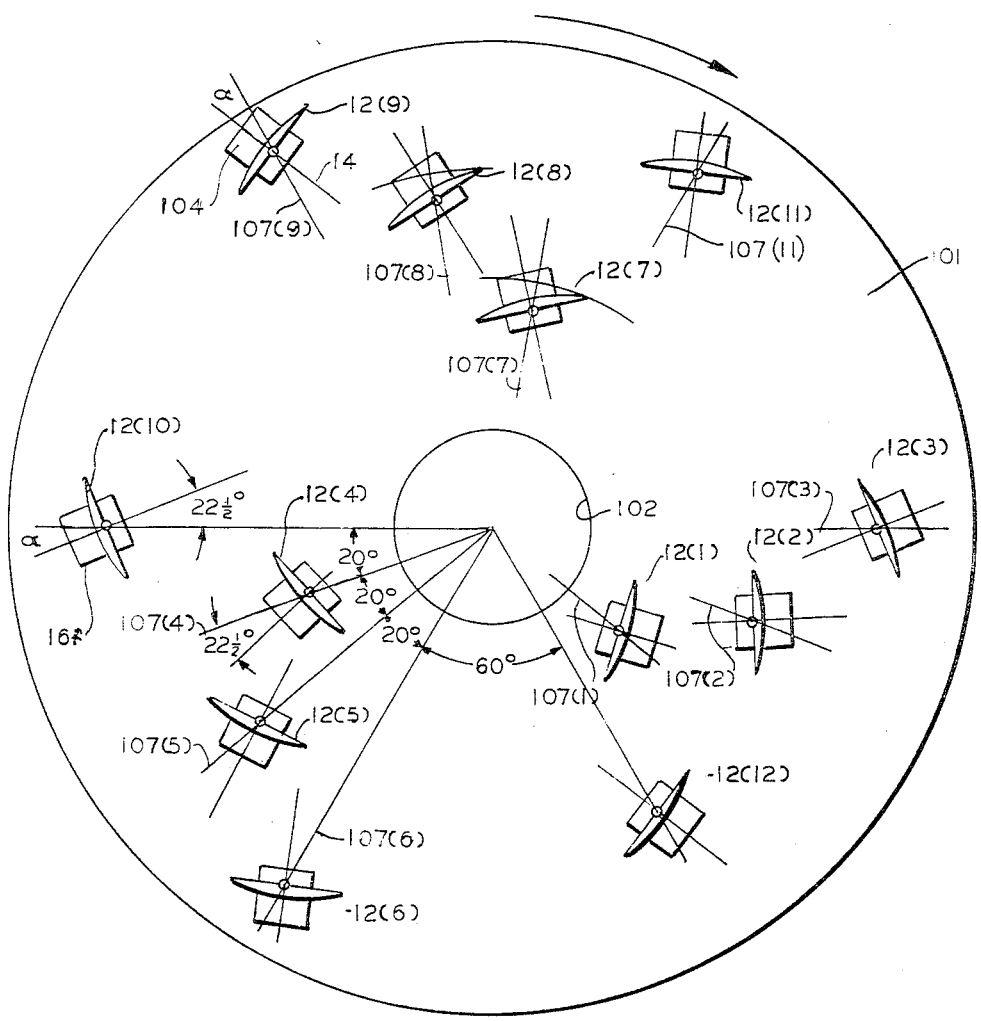

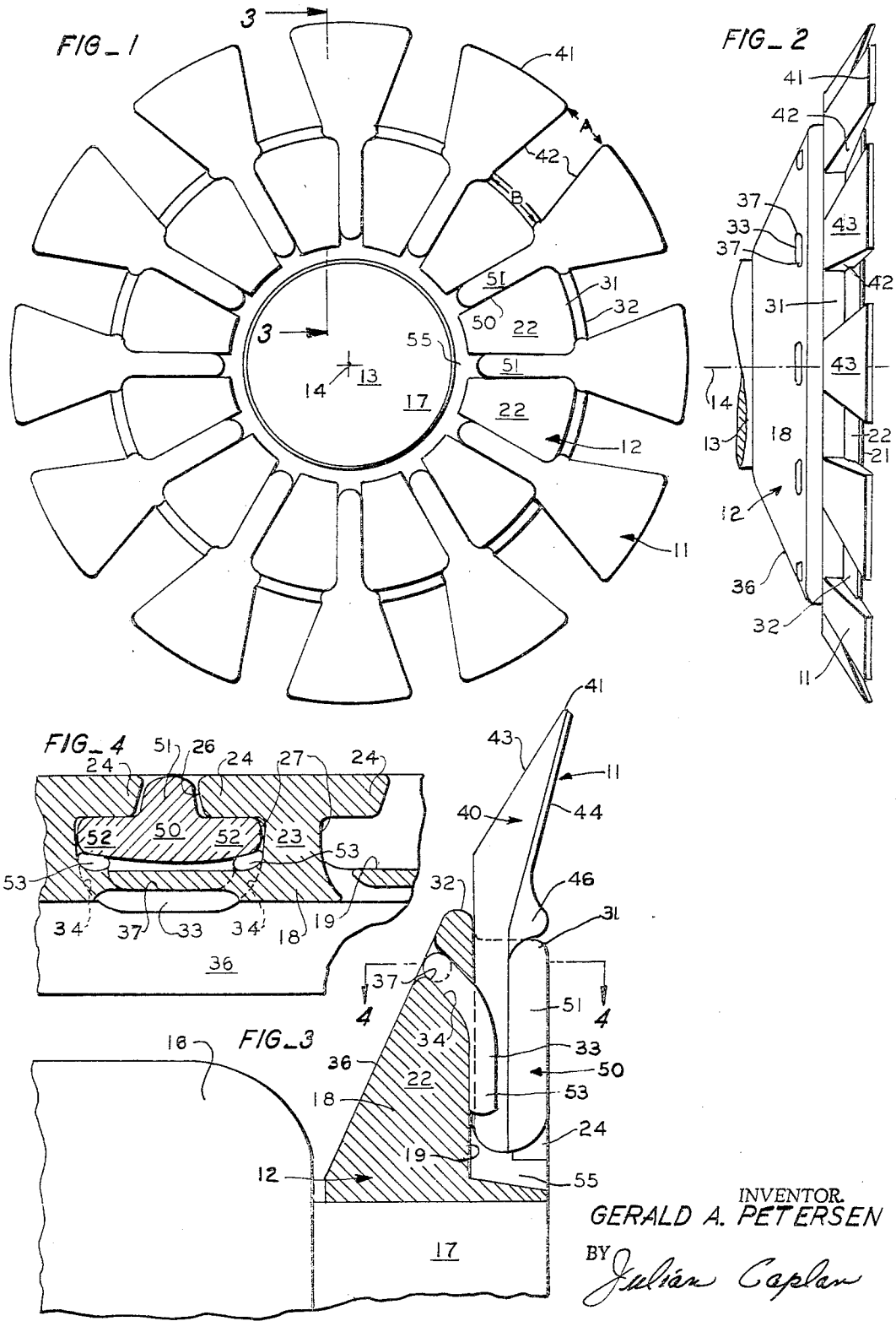

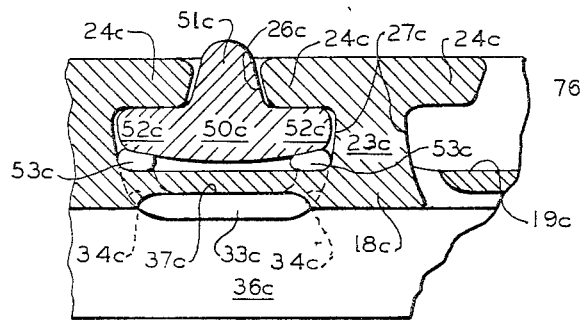
FIG_5
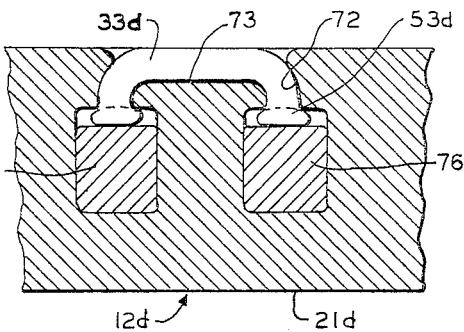
FIG_9
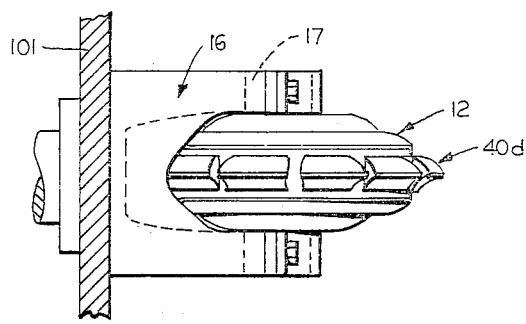
FIG_12A
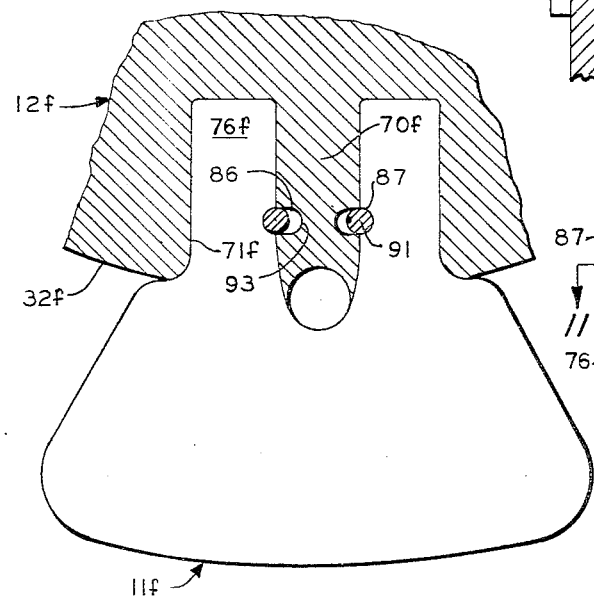
FIG_11
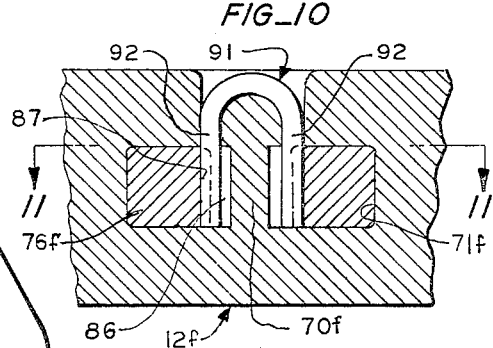
FIG_10

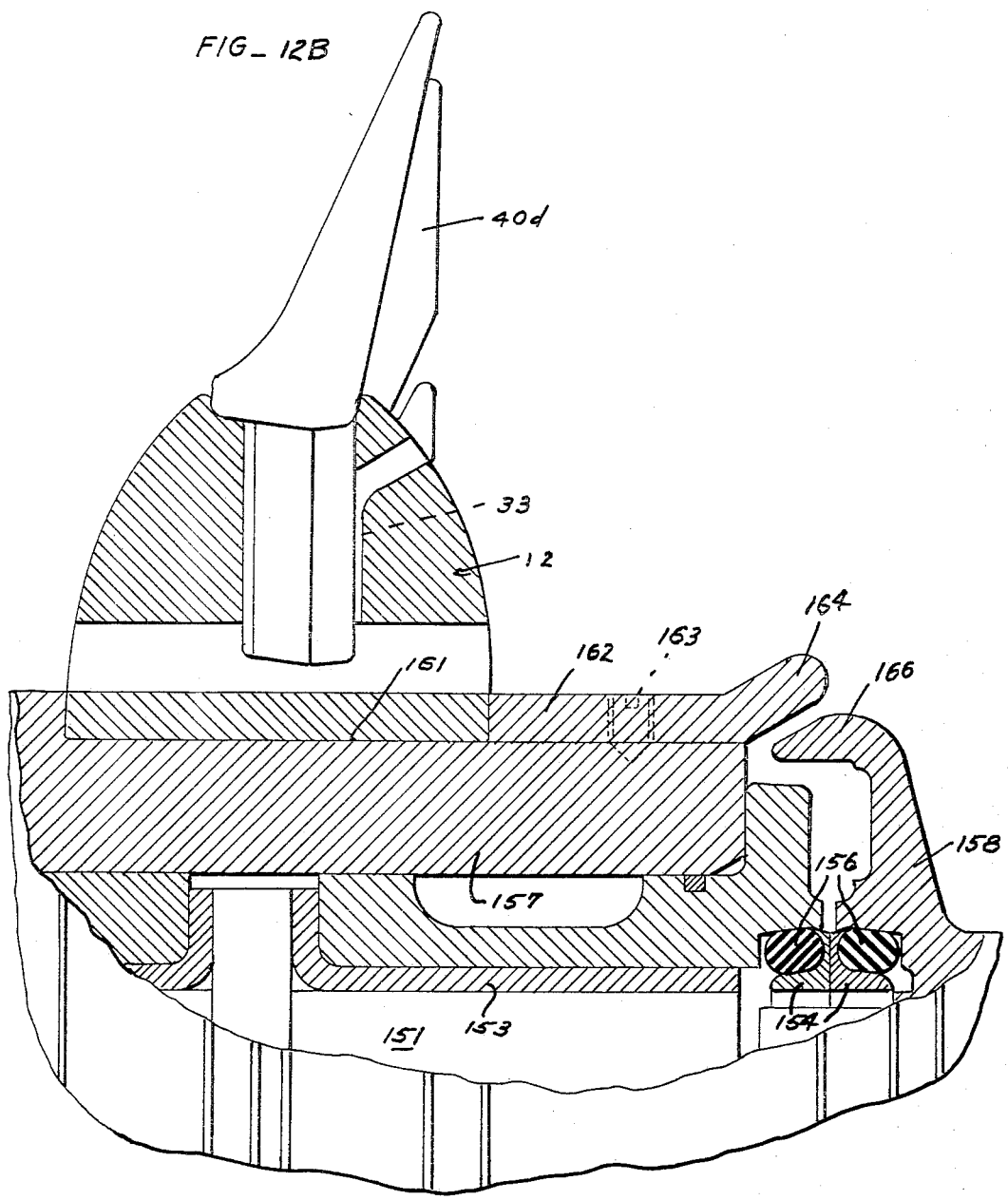

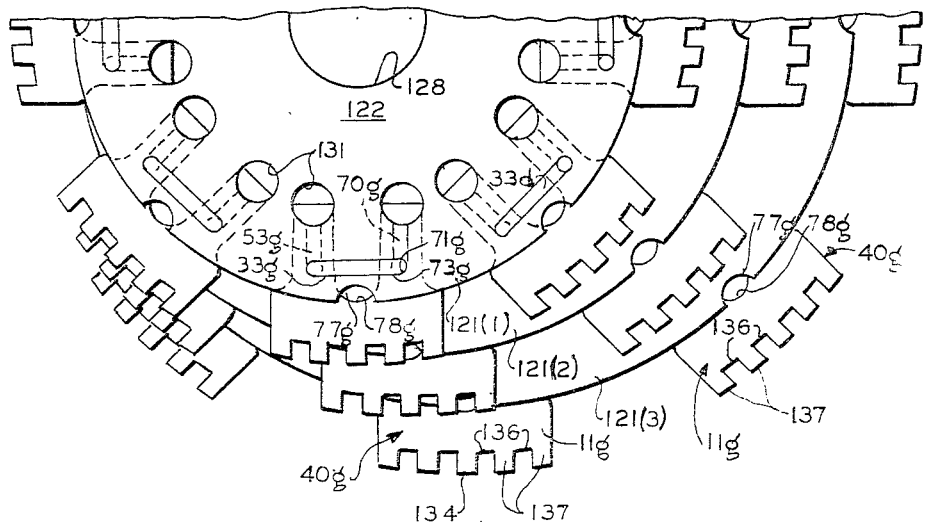
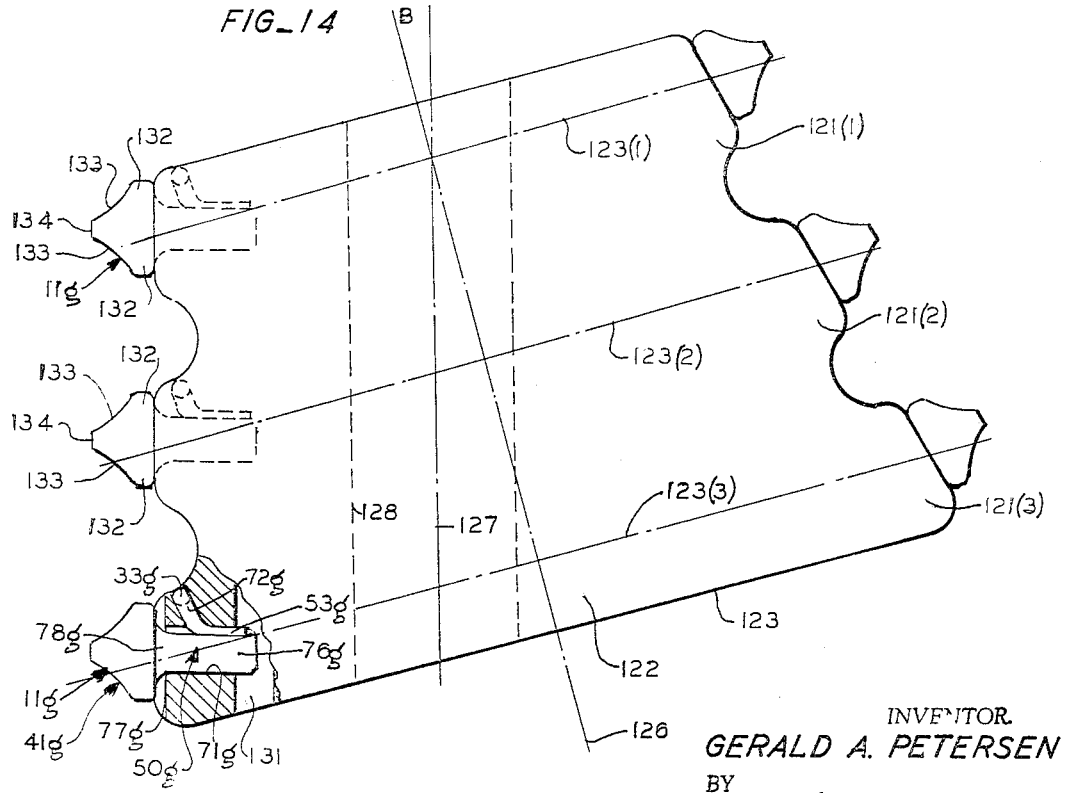

United States Patent Office 3,483,931
Patented Dec. 16, 1969

3,483,931
ROUND HOLDER FOR REPLACEABLE CUTTERS FOR EARTH-DIGGING
Gerald A. Petersen, Sunnyvale, Calif., assignor of one-half to Anita E. Petersen, Saratoga, Calif.
Filed Oct. 22, 1965, Ser. No. 501,409
Int. Cl. A01b 21/02
U.S. Cl. 172—548                                    5 Claims

ABSTRACT OF THE DISCLOSURE

A round holder having replaceable cutters for tunneling machines and other earth digging machines. The periphery of the holder has spaced tooth sockets. The teeth extend radially beyond the periphery, preferably making the shape convex-concave. A resilient insert compressed between the tooth and socket detachably retains the tooth. Replacement of teeth without the necessity of removing the holder from the equipment is facilitated and "down time" of the equipment reduced.

---

This invention relates to a new and improved round holder for replaceable cutters for earth-digging. More particularly, the invention relates to a central member, which may be either power-operated or drag-operated, apertured for replaceable cutters and, when such cutters or teeth are installed, shaped and functioning in a manner similar to a disk harrow. A plurality of such cutters may be used in earth-digging equipment of various types, one preferred type being a tunneling machine. A feature and advantage of the invention is the reduction in "dead time" or "down time" of equipment with which the invention is used. Taking as an example a tunneling machine, replacement of cutters in conventional equipment is time consuming and is a substantial factor in job cost. The present invention provides a permanent structure having replaceable cutters which can be changed quickly. This saving in cost of operation by use of the present invention is of great economic importance.

The holder hereinafter described in detail is provided with sockets for teeth spaced around its periphery. For convenience, it is refererd to herein as a "disk," although its shape may vary somewhat from exact definition of that term. When viewed axially of the holder, the teeth in said sockets extend radially beyond the periphery of the holder. When the teeth are in place the shape of the assembly is convex-concave.

The device may be used in the manner of a disk harrow cutter. Further, a plurality of such disks may be rotatably supported in a boring head used in a tunneling machine, drill, or similar excavating equipment.

Another feature of the invention is the means whereby the individual teeth are retained in their sockets so that they are not normally unintentionally dislodged. On the other hand, when it is necessary to remove teeth for replacement, sharpening, or other purposes, the teeth may be driven out of their sockets. A preferred means for retaining the tooth to restrain unintentional withdrawal is the provision of a resilient insert which is compressed between the tooth and the walls of the socket receiving the proximal part, it being understood that other means for retaining the teeth in their sockets may be used, some such alternate means being hereafter defined. Such resilient insert may be of a synthetic material which will withstand high temperatures encountered in some operations.

A further feature of the invention is the provision of teeth which are wider at their cutting edges than at the location of their entry into the holder. The gap between teeth is less at the cutting edges than at the location of entry into the holder to prevent stones and other foreign material lodging between the teeth.

An optional feature of the invention is a construction such that the tooth may seat against the front end of the tooth-holder rather than interiorly of the tooth-holder. This arrangement prevents the tooth from breaking off as might otherwise occur if the corner of the tooth strikes a rock or other hard object with great force.

In a preferred form of the invention, the teeth are inserted in radially-disposed sockets around the periphery of a round holder, hereinafter referred to as a "disk," adjacent sockets being defined by T-shaped separators which project upwardly adjacent the periphery of the disk and each defines one-half of a socket for a tooth and adjacent separators combine to define a socket for a tooth.

In a preferred rotary head a plurality of disks of the character described is supported in a pattern. Where relatively soft material is encountered the axes of rotation of the disks are at an angle with respect to a radial line from the axis of the head. Hence each disk performs a cutting function similar to a harrow disk and the replaceable teeth in the head cut through relatively soft material as in tunneling, with relatively slight axial pressure. In such disposition of the disk, the teeth force the soil to the side (as in harrowing) rather than lifting the soil by wedging (as in drag teeth); hence there is less friction generated when digging hard formations. Reduction in friction reduces tooth wear and also permits faster rotation because the teeth do not tend to overheat.

Where hard rock is encountered the angles of the disk pattern may be changed so that the axis of rotation coincides with a radius of the head. In this form axial pressure is relied upon to drill. The shapes of individual replaceable teeth differs in boring and drilling as hereinafter described. A feature of the construction, however, is that teeth are replaceable and different shapes may be used.

In another modification, a plurality of disks is fixed in a drill head similar to a three-cone bit, all as described in greater detail. The disks have replaceable teeth which may be interchanged.

Other objects of the present invention will become apparent reading the following specification and referring to the accompanying drawings in which similar characters of reference represent corresponding parts in each of the several views.

In the drawings:

FIG. 1 is a plan view of one form of disk embodying the present invention.

FIG. 2 is a side elevation thereof.

FIG. 3 is an enlarged fragmentary sectional view taken substantially along the line 3—3 of FIG. 1.

FIG. 4 is a transverse sectional view taken substantially along the line 4—4 of FIG. 3.

FIG. 5 is a view similar to FIG. 4 of a modification.

FIG. 6 is a fragmentary plan view similar to FIG. 1 of a further modified disk showing two different forms of replaceable teeth.

FIGS. 7 to 9, respectively, are sectional views taken along corresponding reference lines in FIG. 6.

FIG. 10 is a view similar to FIG. 9, of a further modification.

FIG. 11 is a sectional view, taken substantially along the line 11—11 of FIG. 10.

FIG. 12 is a schematic bottom plan view of a boring head in accordance with the present invention.

FIG. 12A is a schematic sectional view through a portion of FIG. 12.

FIG. 12B is a fragmentary sectional view for a preferred mounting for a holder.

FIG. 13 is a fragmentary bottom plan view of a drilling cone, using the present invention.

FIG. 14 is a sectional view through the structure of FIG. 13.

FIGS. 1 to 4, inclusive, illustrate a preferred embodiment of the invention wherein peripherally-spaced teeth 11 are received in annular holder 12 (herein for convenience referred to as a "disk") mounted on shaft 13 rotatable about the axis 14 of the shaft. The position of teeth 11 and the shape of disk 12 and the angular location of the teeth relative to axis 14 results in a device similar to the disk of a disk harrow. A plurality of such disks 12 may be suitably mounted in a head 16 which may be advanced in a direction at an angle to axis 14 to excavate, particularly in a tunneling machine.

Each disk 12 has a central hub 17 receiving shaft 13. Outwardly of hub 17 is a frusto-conical extension 18 having an annular step 19 around the periphery of the base 21 of the cone. Annular step 19 is divided into a plurality of sockets by a corresponding plurality of separators 22, each of which is T-shaped in cross-section having the leg 23 of the T extending upwardly from the bottom of step 19 in a radial direction. The cross-arms or lips 24 of the T-shaped separator 22 extend oppositely toward the corresponding lips 24 of the adjacent separator providing lips separated by a radially-extending narrow gap 26 between separators 22. Below lips 24 the separators are spaced wider apart providing laterally diverging extension 27.

As viewed in plan in FIG. 1, separators 22 are wedge shaped, tapering inwardly. The outer edge 31 of each separator is arcuate and spaced radially inwardly relative to the peripheral edge 32 of the disk base 21.

For the purpose of providing entry for the resilient retainers 33 hereinafter described into the recess of the holder, holes 34 are formed from the conical surface 36 of the disk slanted inwardly and opening into the extensions 27 adjacent the corner where the walls of web 23 intersect the bottom of step 19. The outer ends of a pair of holes 34 for each recess are joined by a chordal groove 37 having a depth about equal to the diameter of holes 34.

Tooth 11 used in the modification of FIGS. 1 to 4 has a distal portion 40 and a proximal portion 50. In the preferred form shown in FIGS. 1 to 4, distal portion 40 viewed in plan is a truncated sector. The arcuate outer edge 41 of tooth 11 is concentric with axis 14, but the side edges 42 slant inwardly so that the gap A between the outer corners of adjacent teeth is substantially less than the gap B between the edges of the teeth at the peripheral edge 32 of the disk. This shape overcomes the tendency of rocks and other objects to become wedged in the gaps between teeth. One surface 43 of tooth 11 is approximately parallel to the slope 36 of the cone and comprises in effect an extension of conical surface 36. The other distal surface 44 of the tooth is disposed at an angle of about 30° with respect to surface 43. Extending transversely across surface 44 is a raised hump 46 which abuts the outer edges 32 of socket separators 22 to limit inward movement of the teeth relative to the sockets. Hump 46 between separators also protects the edges of the separators from wear.

The proximal portion 50 of tooth 11 is T-shaped in cross-section having an outwardly extending rib 51 which is spaced between the lips 24 of adjacent separators 22 and has laterally projecting legs 52 which substantially fill extensions 27 of the recesses between separators. The length of rib 51 of proximal portion 50 is less than the corresponding dimension of step 19 providing a space 52 at the back of the tooth through which an instrument may be inserted to drive the tooth out of its socket when required for replacement, and the like. It will be noted in FIG. 4 that the upper edge of rib 51 is flush with the tops of separators 22. However, the rib 51 may be raised above the level of the separators to facilitate forcing the tooth out of its socket if the opening 55 at the inner end of the tooth is eliminated. The latter construction is illustrated in FIG. 5 where rib 51c is elevated above lips 24c, the corresponding elements being marked with the same reference numerals as in FIG. 4, followed by subscript c.

The preferred retaining means shown in FIGS. 1 to 4 is a short section 33 of circular cross-section resilient material, such as neoprene synthetic rubber, natural rubber, or other suitable material. Where high temperatures are encountered as a result of the digging action, synthetic materials are particularly desirable. The cross-section of retainer 33 is approximately equal to that of holes 34 and groove 37. Insert 33 is bent into U-shape and the ends are installed through holes 34 into the recess prior to the insertion of tooth 11. As the tooth is forced into its socket, the ends 53 are bent back and compressed in the corners between the web 23 of the separator and the bottom of step 19. The inserts 33 restrain unintentional withdrawal of the tooth from its socket and also accommodate variations in dimensions of the parts. When it is necessary to remove a tooth, the tooth 11 slips relative to the insert ends 53 to permit withdrawal.

In use, disks 12 revolve around axis 14 and each tooth 11 performs its cutting function as it comes in contact with the surface being excavated, which is generally parallel to the axis of rotation. The provision of a plurality of teeth 11 insures that a plurality of cutting edges 41 dig into the excavated surface and augment the digging action as compared with a conventional disk cutter. Abrasion is absorbed by the hardened steel of teeth 11 which is harder than disk 12 itself but disk 12 absorbs the shock of obstructions which may be encountered during digging. When the teeth are worn they may be replaced or sharpened and the means for holding the teeth in their sockets heretofore described facilitates removal and re-installation.

FIGS. 6 to 9 illustrate a further modified device. As shown in FIG. 6, two different types of teeth 11d, 11e are illustrated, it being understood that the teeth are interchangeable but only one form would be used at any time. The form of tooth 11d is used in earth boring, whereas the form 11e is preferably used for drilling rock and other hard substances.

Disk 12d resembles the disk of FIG. 1 in many respects, having a central hub 17d, one flat surface 21d transverse to the axis of rotation and a slanted surface 43d, the disk terminating in a peripheral edge 32d. Formed extending in from edge 32d are pairs of parallel recesses 71, each substantially rectangular in cross-section and spaced equi-distantly on either side of a radius and parallel thereto. Web 70 separates recesses 71. A backward-downward slanted hole 72 communicates from the outer edge of surface 21d with each recess 71, and pairs of holes 72 are joined by a chordal groove 73. Resilient insert 33d is bent in U-shape and the ends 53d thereof are inserted through holes 72 into recesses 71 and each end is jammed between a tooth and a wall of a recess 71 to restrain unintentional withdrawal of tooth 11d or 11e. Insert 33d is preferably of rubber or a synthetic rubber substitute and, in rock drilling operations where high temperatures are encountered, the use of a synthetic is particularly desirable.

Tooth 11d, which is particularly useful in softer materials such as ordinary earth encountered in tunneling, has a distal portion 40d and a proximal portion 50d. Proximal portion 50d consists of two discrete prongs 76, each slightly shorter in depth than recess 71 and having approximately the same width as recess 71. The ends 53d of insert 33 are compressed between one surface, such as the top surface of each prong 76 and the adjacent wall of the recess 71. Web 70 substantially fills the longitudinal slot between prongs. The ends 53d of insert 33d accommodate variations in dimensions of parts. To accomplish withdrawal of the tooth from the disk when required, a notch 77 may be formed in the periphery of the disk inward of the forward end 78 of the slot which separates the two prongs 76. A tapered tool (not shown), such as a drift pin, may be inserted in the space between notches 77, 78 and used to force the tooth out of its socket against the restraining force of the resilient insert. Alternatively, holes may be left in the back of the recess for the entry of the tool to drive prongs 76 forwardly.

The distal portion of tooth 40d is subject to certain variations. In the form shown, the side edges 52d are spaced apart a greater distance than the outer edges of the prongs 76 and slant outwardly so that the tooth is considerably broader at its outer edge than at the location where it joins the disk 12d. The edges 42d on opposite sides of the tooth converge at an angle less than the angle between radii at the outer corners of the tooth so that the gap between teeth is greater at the periphery of disk 12d than it is at the periphery of teeth 11d, thereby preventing rocks and other foreign material from wedging between the teeth. One surface 43d of distal portion 40d is slanted at about the angle of surface 36d, slanting upwardly-outwardly. The opposite surface of the distal portion has a transverse hump 77 which limits inward movement of the tooth relative to disk 12d and also protects the disk from abrasion. Outwardly of hump 77 the surface 78 of portion 40d curves in approximately a parabola and is truncated in the outer arcuate edge 79 where surface 78 intersects surface 43d.

In the form of the invention shown in FIG. 7, tooth 11e has a proximal portion 50d which is similar to tooth 11d, and the same reference numerals are employed. The distal portion of tooth 11e, however, differs from that shown in tooth 11d. Thus the tooth 11e is symmetric about a plane through the peripheral point 81 and top and bottom surfaces 82, 83 curve inwardly in a diverging shape so that there are top and bottom humps 84 where tooth 11e contacts rim 32d. As has previously been stated, tooth 11e is suitable for boring rock where cutting edge 81 is approximately perpendicular to the surface being bored.

Turning now to the form of the invention shown in FIGS. 10 and 11, disk 12f is formed at its peripheral edge 32f with pairs of recesses 71f, similar to those previously described insofar as cross-section is concerned. Thu a web 70f exists between the recesses 71f. In this form of the invention, notches 86 are formed in the walls of web 70f facing recess 71f.

The tooth 11f used with this form of the invention has prongs 76f substantially complementary to recesses 71f and separated by a slot which has a width about equal to that of web 70f. Notches 87 are formed in the inner walls of prongs 76f facing notches 86 in web 70f.

A resilient retainer 91 is used, formed of a wire or spring substance bent in the form of a U and having legs 92 which fit through holes 93 in disk 12f and pass through the notches 87 in prongs 76f in the assembled position of tooth and holder. As is apparent in FIGS. 10 and 11, notches 86 are enlarged and hence when the teeth 11f are forced so that prongs 76f enter recesses 71f, legs 92 deform into notches 86 and permit the prongs 76f to be inserted. However, when the tooth is fully seated in its sockets, legs 92 fit into notches 87 and hold the tooth in place. A drift pin may be inserted through opening 93 to force the tooth out of its socket, thereby again deflecting the legs 92 into the notches 86, or a tool may be inserted through openings 94 in the back of prongs 96f to drive the tooth out of the holder.

The distal portion of tooth 11f, which is shown only partially in FIG. 10, may be of any suitable shape similar to that of FIGS. 1, 6, or 11, or the like.

Turning now to the boring head of FIG. 12, there is illustrated a practical adaptation of the disk specifically illustrated in FIGS. 1 and 6. An annular head 101 is provided, said head being rotated by any suitable means. For example, the head 101 may be affixed to an earth auger (not shown) which fits into the central hole 102 thereof.

Positioned in a pattern over the surface of head 101 is a plurality of disks 12, it being understood that said disks may be of a type heretofore described or may be otherwise constructed. A preferred pattern of placement of the disks is also hereinafter described in detail. Each disk 12 has a shaft 13 receiving a clevis-shaped support 104, fixed to head 101. Thus each disk 12 may rotate about its axis 14. As will particularly be noted in FIG. 12, the axis 14 is disposed at an angle alpha with respect to a reference line 107, which reference line is a radial line with reference to head 101. Assuming a clockwise direction of rotation, as viewed in FIG. 12, angle alpha lags with respect to radius 107. In the form of the invention illustrated in FIG. 12, angle alpha is approximately 22½°. Such angle is therefore comparable to the angle of a disk harrow in operative position and provides a boring action similar to the action of harrow disks for agricultural purposes.

A plurality of disks 12 is mounted on head 101 and in order to facilitate explanation of the pattern, each disk is marked with the reference numeral 12, followed by an identifying number in parentheses. Proceeding outwardly from the center of head 101, disk 12(1) is the first of a pattern of three disks, the others of which are marked 12(2) and 12(3), the radius 107 of which lags 20° with respect to the preceding disk. The spacing of the disks 12(1) to 12(3) is staggered. 120° ahead of disk 12(1) is disk 12(4), which is the innermost of a group of three disks, the others of which are 12(5) and 12(6). The radial distance of disk 12(4) is intermediate 12(1) and 12(2). The angular distance between the radii 107(4), 107(5) and 107(6) is 20° and the disks 12(4), 12(6) are, respectively, at a slightly greater radial distance than the disks 12(1) to 12(3).

120° in advance of disk 12(4) is disk 12(7), which is one of a pattern of three disks, the others being 12(8) and 12(9). The radii 107(7), 107(8) and 107(9) are regularly spaced 20°. Disk 12(7) is spaced radially outwardly, with respect to head 101, a distance slightly greater than disk 12(4). Expressed in other words, disk 12(4) is intermediate disk 12(1) and 12(7). The other disks of the three groups heretofore described are similarly staggered.

In addition to the nine disks heretofore mentioned, three additional disks are shown positioned in head 101. Thus diametrically opposite disk 12(3) is disk 12(10), which is approximately midway between the group consisting of disks 12(4) to 12(6) and the group consisting of disks 11(7) to 11(9), and the radial distance of disk 12(1) from the center of head 101 is about equal to that of disk 12(3). Disk 12(11) is diametrically opposite disk 12(6) and positioned from the center of head 101 an approximately equal distance. Disk 12(12) is diametrically opposite disk 12(9), but since disk 12(9) is the outermost of the disks heretofore described, in order to facilitate support of disk 12(12) in head 101 the distance from the center of head 101 is about the same as disk 12(8). The function of disks 12(10) to 12(12) is to provide extra digging action in the relatively large arcuate spaces between the outer disks.

In use, the head 101 is advanced along its axis of rotation which, in effect, is parallel to the axis of rotation of the individual disks 12. As the head 101 revolves, a drag is created on the individual disks 12, causing them to rotate about their own axes bringing each of the replaceable teeth into cutting position and digging the soil. Since the angle alpha lags with respect to radii 107, the boring action of the individual disks is similar to a harrow disk and thus in relatively soft soil, or even in relatively soft rock, the boring action is readily performed with teeth 40 similar to those shown in FIG. 1, and also shown as 40d in FIG. 6. The placement pattern of the disks insures that the entire annular area of head 101 is covered and, also, that tendency toward side thrust is counterbalanced.

When it is necessary to drill through harder soil, such as rock, the angle alpha between axis 14 and radii 107 may be changed so that these two lines more closely coincide or, in fact, actually coincide. In such position the head 101 must be power-driven forwardly along the axis of head 101. Further, rock drilling teeth such as 11e are best used for this purpose. The means whereby the angle alpha is adjusted is not herein shown. It will be understood that separate heads 101 may be substituted when a different angle alpha from that shown in FIG. 12 is desired.

One suitable heavy-duty mounting is shown in FIG. 12B. This structure is an adaptation of a tractor roller such as shown in Patent No. 3,073,689. Such structure employs a shaft 151 attached to rotatable plate 101 by members 12h. Surrounding shaft 151 is shell 152 with antifriction bushings 153 interposed between shaft 151 and shell 152. To prevent escape of lubricant and ingress of foreign material, metal-to-metal seal rings 154 and resilient backing rings 156 are interposed between member 157 inside shell 153, cap 158 on shaft 151.

The conventional construction is modified by forming a step 161 on the exterior of shell 152 and forcing disk 12 axially inward from one end. Disk 12 may be held in place by a shrink fit or other secure means. A collar 162 may be installed over step 161 behind disk 12 and secured by set-screw 163, or other means. Collar 162 has a flange 164 cooperating with lip 166 on cap 158 to reduce likelihood of foreign matter interfering with operation.

The structure of disk 12, teeth 40d held thereby, and tooth retaining means 33h, are as in preceding modifications and similar reference characters are employed.

FIGS. 13 and 14 show a drilling bit using the removable tooth disk principle, there being three disks 121(1) to 121(3) of increasing diameter formed integral about a central hub 122, or fixed relative to each other. Disks 121 lie in planes 123(1) to 123(3) which are parallel to base 124 and which are disposed at angle beta to line 126, which is the common central axis of the disks. Hub 122 has a bore 128 concentric with axis 127 to receive the shaft of the bit (not shown). Similarly the principle of the "three-cone bit" used in oil well and other rock drilling is evident.

Replaceable teeth 11g are subject to some variation. As illustrated, the proximal portions 60g of said teeth resemble the proximal portions of teeth 11d of FIG. 6; likewise the sockets in the disk and resilient retainers are similar to that modification and hence the same reference numerals followed by subscript g are used to designate corresponding parts. It will be understood that the attachment means for the teeth may resemble that shown in FIG. 1, 5, or 10, or other means. Cleanout holes 131 are provided behind the prongs 76 to facilitate withdrawal of the teeth, so to prevent dirt jamming the sockets 71g.

The distal portions 40g of teeth 11g are also subject to variation. In the preferred form shown, top and bottom transverse ridges 132 are provided to limit inward movement of the teeth and, also, to protect the edges of the disks from abrasion. Side edges 133 of teeth 11g are parallel, spaced far apart, the tooth being quite broad in plan. The top and bottom surfaces 133 curve convergingly outwardly and are truncated in a flat, relatively thin peripheral edge 134. Edge 134 is serrated by a plurality of substantially square slots 136 to provide a plurality of square cutting points 137. The angle beta insures that as the drill is advanced along axis 127 it rotates about said axis and each tooth 11g in each cone 121(1) to 121(3) comes in contact with the bore of the hole being drilled. Additionally the individual cutting points 137 perform their drilling function. By reason of the construction heretofore described the drill of this modification will drill through relatively hard rock.

Although the foregoing invention has been described in some detail, by way of illustration and example for purposes of clarity of understanding, it is understood that certain changes and modifications may be practiced within the spirit of the invention.

What is claimed is:

1. For use in a digging implement, a holder comprising a hub, a frusto-conical extension around said hub, a plurality of tooth holding means in said extension around the periphery of said holder, said holding means each formed with a recess shaped to receive the proximal end of a tooth, a plurality of replaceable hard teeth projecting beyond the periphery of said holder, each said tooth having a distal portion formed with a cutting edge and a proximal portion, said proximal portion received in one of said recesses and detachable means for securing said tooth in its holding means, the distal portion of each said tooth formed with a first surface slanting outwardly to comprise a prolongation of the conical surface of said extension, and a second surface opposite said first surface projecting axially beyond the end of said extension opposite the conical surface thereof, said holder and said plurality of teeth forming a concave-convex shape with said cutting edges around the periphery of said shape, said holder being formed with a peripheral step and a plurality of separators being formed on said step extending radially, adjacent separators being shaped in cross-section whereby the space between two said separators is substantially complementary to said proximal end of a tooth, said separators defining said holding means.

2. An implement according to claim 1, in which said holding means is formed with an aperture and said detachable means extends through said aperture and into said recess between one said tooth and corresponding holding means.

3. An implement according to claim 1, in which said tooth is formed with an enlargement outwardly of said holding means, said enlargement seating against the outer end of said holding means.

4. An implement according to claim 1 in which each said tooth is substantially wider across the outer corners of said tooth than inwardly of said outer corners.

5. An implement according to claim 1 in which each said tooth has a spade shape in plan, the back of said tooth being slanted and substantially flat, the front of said tooth being concave.

References Cited

UNITED STATES PATENTS

| | | | |
|---|---|---|---|
| 2,915,290 | 12/1959 | Petersen | 175—392 |
| 3,117,386 | 1/1964 | Ferwerda | 37—142 |
| 3,121,289 | 2/1964 | Eyolfson | 37—142 |
| 3,190,379 | 6/1965 | Troeppl et al. | 175—385 |
| 3,282,629 | 11/1966 | Rollins | 299—85 |
| 369,163 | 8/1887 | Clark | 172—555 |
| 3,012,346 | 12/1961 | Larsen. | |
| 3,041,752 | 7/1962 | Evans. | |
| 3,057,091 | 10/1962 | Petersen. | |
| 3,091,044 | 5/1963 | Penote et al. | 37—142 |
| 3,252,391 | 5/1966 | Dils | 94—48 |
| 3,345,765 | 10/1967 | Petersen. | |
| 3,349,508 | 10/1967 | Petersen. | |
| 3,307,277 | 3/1967 | Kondracki | 37—141 |

ROBERT E. PULFREY, Primary Examiner

R. C. HARRINGTON, Assistant Examiner

U.S. Cl. X.R.

37—142; 299—92